(12) United States Patent
Gosh et al.

(10) Patent No.: US 9,740,429 B2
(45) Date of Patent: Aug. 22, 2017

(54) RELAY INTERFACE MODULE FOR A DISTRIBUTED CONTROL SYSTEM

(71) Applicant: ABB RESEARCH LTD, Zürich (CH)

(72) Inventors: Sanjay Gosh, Bangalore (IN);
Mallikarjun Kande, Bangalore (IN);
Michael Wahler, Zürich (CH); Sanjeev Koul, Bangalore (IN); Senthil Kumar Sundaram, Bangalore (IN); Sunderam Sankaran, Tamil Nadu (IN)

(73) Assignee: ABB Schweiz AG, Baden (CH)

( * ) Notice: Subject to any disclaimer, the term of this patent is extended or adjusted under 35 U.S.C. 154(b) by 52 days.

(21) Appl. No.: 14/315,818

(22) Filed: Jun. 26, 2014

(65) Prior Publication Data

US 2014/0310435 A1 Oct. 16, 2014

Related U.S. Application Data

(63) Continuation of application No. PCT/IB2012/002799, filed on Dec. 26, 2012.

(30) Foreign Application Priority Data

Dec. 26, 2011 (IN) .......................... 4556/CHE/2011

(51) Int. Cl.
*G06F 13/12* (2006.01)
*G06F 3/06* (2006.01)
(Continued)

(52) U.S. Cl.
CPC ....... *G06F 3/0658* (2013.01); *G05B 19/0423* (2013.01); *G05B 19/41845* (2013.01);
(Continued)

(58) Field of Classification Search
None
See application file for complete search history.

(56) References Cited

U.S. PATENT DOCUMENTS 6,272,386 B1 8/2001 McLaughlin et al.
6,434,612 B1 * 8/2002 Hughes ................ H04L 49/255
709/223
(Continued)

FOREIGN PATENT DOCUMENTS

GB    2 445 636 A     7/2008
WO    WO 99/50726 A1  10/1999
(Continued)

OTHER PUBLICATIONS

International Search Report (PCT/ISA/210) dated Jul. 16, 2013, by the European Patent Office as the International Searching Authority for International Application No. PCT/IB2012/002799.
(Continued)

*Primary Examiner* — Henry Tsai
*Assistant Examiner* — Aurangzeb Hassan
(74) *Attorney, Agent, or Firm* — Barnes & Thornburg LLP

(57) ABSTRACT

A relay interface module that is commutatively connectable to at least one I/O device and a controller, wherein the relay interface module is configured to provide data from the I/O device to at least one controller in a distributed control system (DCS) via a communication interface. An application related to a particular I/O device may then be executed freely on any controller present in a DCS without losing real time connection with the associated I/O device. Data can be transferred from an I/O device to an associated application executed on a controller such that the real time connection between the I/O device and the application being executed is maintained.

9 Claims, 6 Drawing Sheets

(51) Int. Cl.
*G05B 19/042* (2006.01)
*G05B 19/418* (2006.01)
*G06F 13/16* (2006.01)

(52) U.S. Cl.
CPC ............ *G06F 3/061* (2013.01); *G06F 3/0673* (2013.01); *G06F 13/1668* (2013.01); *G05B 2219/25232* (2013.01); *G05B 2219/25234* (2013.01); *G05B 2219/33273* (2013.01); *G06F 3/067* (2013.01); *G06F 3/0607* (2013.01); *G06F 3/0689* (2013.01); *Y02P 90/16* (2015.11)

(56) References Cited

U.S. PATENT DOCUMENTS

| | | |
|---|---|---|
| 2006/0259259 A1 | 11/2006 | Rozenboim et al. |
| 2007/0038700 A1* | 2/2007 | Eryurek ............ G05B 19/0426 709/203 |
| 2007/0083275 A1 | 4/2007 | Law et al. |
| 2010/0063614 A1 | 3/2010 | Rosenboim et al. |
| 2010/0100654 A1* | 4/2010 | Ramsay ................ G06F 13/385 710/100 |
| 2012/0266976 A1* | 10/2012 | Goodyear ................ F04F 5/24 137/488 |

FOREIGN PATENT DOCUMENTS

| | | |
|---|---|---|
| WO | WO 2006/119011 A2 | 11/2006 |
| WO | WO 2007/021712 A2 | 2/2007 |

OTHER PUBLICATIONS

Written Opinion (PCT/ISA/237) dated Jul. 16, 2013, by the European Patent Office as the International Searching Authority for International Application No. PCT/IB2012/002799.

* cited by examiner

RELAY INTERFACE MODULE FOR A DISTRIBUTED CONTROL SYSTEM

RELATED APPLICATION

This application claims priority as a continuation application under 35 U.S.C. §120 to PCT/IB2012/002799, which was filed as an International Application on Dec. 26, 2012 designating the U.S., and which claims priority to Indian Application 4556/CHE/2011 filed in India on Dec. 26, 2011. The entire contents of these applications are hereby incorporated by reference in their entireties.

FIELD

The present disclosure relates generally to a device and a method for transferring I/O data to more than one controller in a distributed control system, such as a relay interface module that enables the method and provides for transferring I/O data.

BACKGROUND INFORMATION

Distributed Control Systems (DCS) have been employed in process plants for controlling plant processes in the process plant. A DCS can have controllers that are embedded devices. A controller for a DCS can also be a general or Industrial Computer, Programming Logic Controller (PLC), and any computing unit capable of providing a real time execution environment to control applications.

It will be understood that control of processes is essential for proper functioning or operation of a process plant. The processes referenced here are characterized by factors relating to process plant unit operation, associated hardware, control applications, workflow etc. Any change in these factors, such as the control applications, can influence the operation of the process plant. These factors are also constrained by one or more of the system configuration, hardware capability, communication, current state of the process, and by its capabilities thereof, as applicable.

In a distributed control system, the controllers can be distributed and associated with one or more processes/units in a process plant. The process information can be gathered by a controller through an input device connected to a transducer or transmitter, which are field devices, or directly from a field device using compatible protocols. Similarly, a controller output can be used for actuation through an output device or directly through a field device using compatible protocols. It is known to have one or more Input-Output (IO) devices and field devices allocated to a specific controller (e.g., these devices would communicate with only the specific controller connected with them). Therefore, the control applications executing on a controller can have access to a limited and preconfigured set of I/O devices or field devices. Hardware devices called Communication Interface (CI) modules can be used to connect and scale the number of I/O units and field devices which can be allocated to a controller. CI modules can include a master and a slave hardware component where a CI master is attached to a controller while a CI slave is used as a convergence point for several I/O/field devices. Thus, each I/O unit is configured to serve and to be connected to a single controller in a network. For efficient execution of a control application, process information gathered from an I/O unit or from field devices can be as far as possible executed in a single controller. In cases where this is not possible, process information can be shared using a controller to controller communication, thus providing indirect access of process information to another controller to execute associated control applications.

The configuration of a DCS can be static; e.g., they do not generally allow direct access to I/O units, dynamic sharing or migration of control applications, or parts thereof (henceforth, parts thereof are said to be included in the reference to a control application), among peer controllers in a plant. However, in practical situations, a control system may adopt or encounter changes or modifications in its configuration with regard to one or more of the factors mentioned herein, during operation. For example, changes to control applications can become significant such that they need to be addressed online (e.g., during the operation of the plant without stopping or suspending the plant operation to have the desired change be incorporated without disturbing the plant operation).

GB 2445636 describes an I/O card that is used to interface two process controllers over a communication line that is separate from a primary communication line connecting the two process controllers to a workstation. The process controllers can access I/O cards in the same manner as I/O cards connect to field devices. Inter-controller communications can be programmed as general I/O communication that may utilize, for example, Ethernet, Token ring, FDDI, ARCNET, WiFi, serial or parallel communication protocols.

It would be desirable to provide a flexible configuration of a DCS that supports dynamic reconfiguration and has a means to provide direct access of process information to peer controllers in the DCS. It would also be desirable to provide a solution that connects information from I/O and field devices to their respective control applications in a situation that involves dynamic distribution of control applications in real time without disturbing the operation of the plant.

SUMMARY

A relay interface module for a distributed control system is disclosed having at least one input/output (I/O) device for at least one of sending and receiving I/O data, and at least one controller having at least one control application, the relay interface module comprising: a network interface for receiving and transmitting I/O data between at least one I/O device and at least one controller of a distributed control system; a memory module configured to store location data associated with at least one controller application of the at least one controller; and one or more processors configured to communicate the I/O data between the at least one I/O device and the at least control application using the network interface based on the location data.

A distributed control system is also disclosed comprising: at least one I/O device having I/O data; at least one controller having at least one control application, wherein the at least one control application is associated with location data; at least one relay interface module to transfer the I/O data between the at least one I/O device and the at least one controller; and wherein the at least one relay interface module includes the location data to transfer the I/O data to the control application in the at least one controller based on the associated location data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
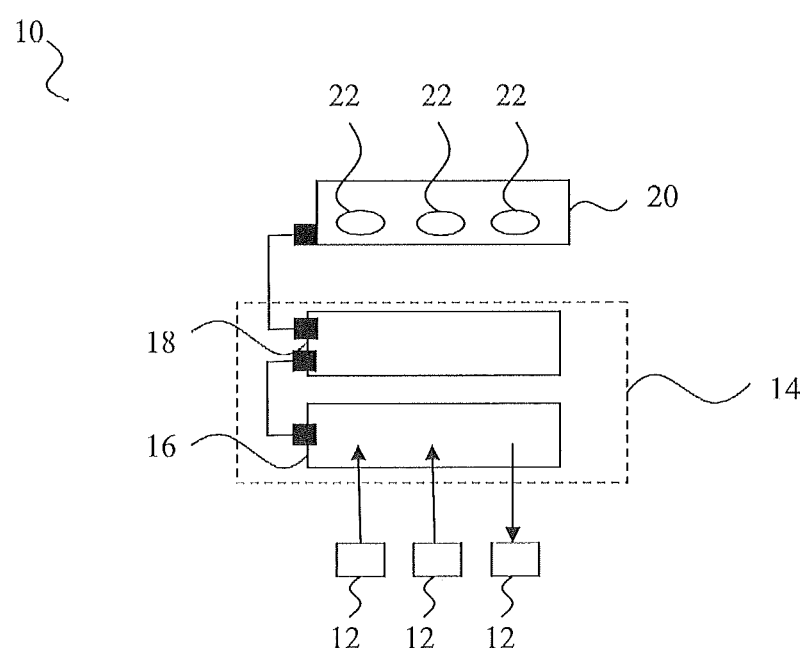
FIG. 1 is a block diagrammatic representation of representative components of an exemplary distributed control system.

In an exemplary aspect, a relay interface module is disclosed which is communicatively connectable to at least one I/O device and at least one controller in a distributed control system. The relay interface module is configured to communicate data between the at least one I/O device and at least one other controller in the DCS.

In another exemplary aspect, a method is disclosed of transferring I/O device data to a controller in a distributed control system. The controller can include a control application associated with the I/O device. The method can include reading a location data of the controller from a communication interface module that is connected to the I/O device. The method can then involve sending I/O device data to the controller based on the location data.

In yet another exemplary aspect, a distributed control system based on the method disclosed herein. The distributed control system can include at least one I/O device which has I/O data that is associated with a control application. The distributed control system can include at least one controller having at least one control application, wherein one of the at least one control applications is associated with the I/O data. The distributed control system can include at least one communication interface module to transfer I/O device data between the I/O device to the associated control application via at least one relay interface module that includes a location data for the I/O data.

The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the term "or" is generally employed in its sense including "and/or" unless the content clearly dictates otherwise.

As used herein, I/O device means any device that is capable of handling input or providing an output in suitable manner that is relevant and useful in a given situation in a process plant. As used herein, an I/O device is said to also include field devices that provide process data or receive data from a controller to provide an output in suitable manner that is relevant and useful in a given situation in a process plant. The I/O devices are usually connected to a controller through a communication interface module.

As used herein, a distributed control system (DCS) refers to a control system of a process plant in which multiple controllers of the DCS are distributed and associated with various units of the process plant. The DCS has communication networks for communication of information, coordination & management and monitoring.

In known DCS systems, each controller executes one or more control applications or part of a control application and can be directly connected with one or more I/O devices. The I/O devices collect process data for example data such as pressure, temperature, roller speed, conveyor belt speed, volume, and the like. Exemplary field devices that provide I/O data include, for example, sensors. The control application in the controller then uses the I/O data for a variety of other purposes, such as estimating if the plant is operating at set levels, if some adjustments are desired for parameters of operation of the plant, or if any shutdown procedures are desired to be invoked, and so on.

FIG. 1 shows a block diagrammatic representation of representative components of an exemplary known distributed control system for a process plant, wherein a single controller and associated components of the DCS are depicted by numeral 10. In the exemplary DCS shown herein, a plurality of I/O devices 12 are connected to communication interface (CI) modules 14, shown here as including two components: a communication slave 16, and a communication master 18. This connection can be a wired connection to ensure effective and immediate transfer of data with minimal loss. The CI module is connected to a controller 20, wherein the controller can include one or more control applications 22 that are executed by the controller and to which the information from the I/O devices are associated. The I/O devices can include field devices that are connectable to the CI module.

In some situations, a controller may have to invoke quite a few procedures for smooth operation of the plant, and consequently may become overloaded. Also in some other situations, a controller (without a redundant controller for standby) may become faulty, thus incapacitating some or all of the control functions associated with the controller. In such situations, one of the options is to transfer one or more control applications to another controller that is not overloaded, thus distributing the load more evenly across the existing controllers and improving reliability. For example, a control application that was running on a first controller is transferred to another controller. However, when a control application is transferred to another controller, the connectivity to I/O devices may be lost or I/O information may not be readily available, as the I/O devices are connected to the first controller and not with the another controller to which the control application is transferred.

Exemplary embodiments disclosed herein provide a relay interface module that is connectable to a controller and also to an I/O device. The relay interface module can be configured to communicate data between the I/O device and at least one other controller that may be identified dynamically on a DCS network. The at least one other controller is a different controller from the controller (remote controller) to which the relay interface module is connected. The DCS network can be a controller network that is used by the controllers in the DCS for controller to controller communication or a private/dedicated communication network provided for communication between the relay interface modules (including communication with a prior-art communication interface module with suitable modification for communication) in the DCS. Thus, a relay interface module can provide additional functionality with regard to providing connectivity to multiple controllers when compared with known communication interface modules. The relay interface device can be provided as an improved communication interface module or as an attachable additional component along with a prior-art communication interface module. Thus the relay interface device can be provided as an integral unit with the communication interface module.

In an exemplary embodiment, the functionality of a relay interface module can be made available as a software enabled component that is within a communication interface module. The software enabled component can be for aspects such as establishing communication, transferring I/O information or any other status/configuration related information. In another exemplary embodiment, the functionality of a relay interface module can be made available as a software enabled component that is within a controller or a computing device hosting controller functionalities. In both these configurations, the communication interface module or the controller wherein the functionality of a relay interface module has been installed or embedded to provide added capabilities due to this software enablement.

In a further exemplary embodiment, a relay interface module is provided as a specialized extraneous hardware component having a centralized switch used for communication. Alternately, a relay interface module or its functionality may be within a local switch that is already present as part of a DCS, or is specifically made available for this purpose. In this embodiment, the communication interface module or the controller or both can involve additional configurations to adapt for sending and receiving information from the relay interface module.

In an exemplary embodiment disclosed herein, a DCS can include a relay interface module communicating I/O data to a first controller by a virtue of the relay interface module being connected to the first controller and the I/O devices sending/receiving I/O data being connected to the relay interface module. Here, the relay interface module can include a means to act as a communication channel between I/O devices and the first controller similar to known communication interface modules. Further, the relay interface module can include at least one additional means (e.g., additional Ethernet port, wireless connectivity) for being connected on a DCS network or a private network for connection with another relay interface module or another controller. Thus, a communication channel between the relay interface module and other controller (other than the first controller) can be established.

Figure 2:
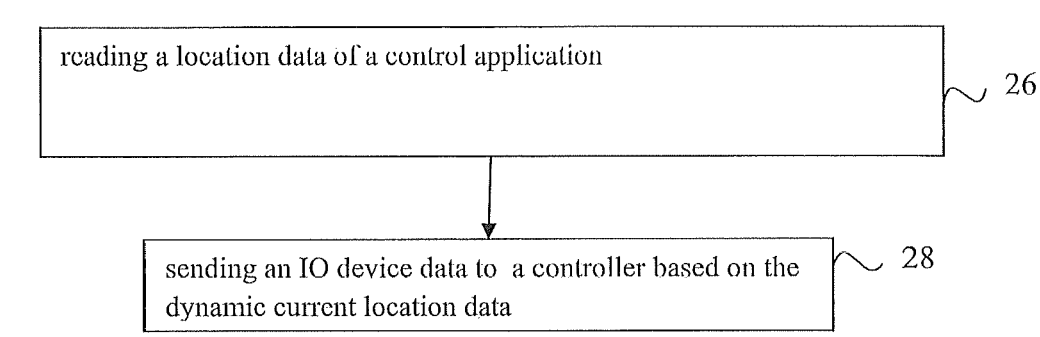
FIG. 2 is a flowchart representation depicting exemplary steps for a method disclosed herein.

Also, as noted herein, in another exemplary aspect, a method is disclosed of transferring I/O device data to/from a controller in a distributed control system. FIG. 2 shows exemplary method steps in a flowchart representation, depicted by the numeral 24. The method can include reading a location data of a control application from a relay interface module that is associated with an I/O device, as shown by numeral 26 in FIG. 2. The location data is dynamic in that the value may change in time. The location data of a control application can include location information of the controller on which the control application is being executed currently. It may have a location identity that is independent of other components. This data can be constantly updated as often as desired to ensure that the current location of the controller on which the application is being executed is made available. In an exemplary embodiment, the update is only when the change in location occurs. In another embodiment the updating is on a periodic basis. The location data in addition may also include information of the I/O device source. The relay interface module functionality may be a software module where a program is being executed on a communication module. In this approach, there can exist an external hardware attached to the CI module called CI-CI communication module which is responsible for switching of the I/O data packets across controllers.

The software component may be made available on a suitable medium such as CD-ROM, a storage disk, flash drive, or in any other manner known to those of skill in the art. Alternately, the software component may be made available on an EPROM or an EEPROM that is then installed into a relevant portion of the system so as to integrate the component seamlessly into the system without disturbing the operation of the entire system. Alternately, the relational interface module may be an additional hardware unit such as a centralized local switch that is made available for this express purpose.

In yet another exemplary embodiment, a relay interface module that includes the current dynamic location data of the controller is made available through a wireless gateway, when a wireless gateway system is being used, or installed for this express purpose. The method can involve sending (receiving) I/O device data to (from) the controller currently executing the associated application for the I/O device, shown in FIG. 2 by numeral 28.

Exemplary methods disclosed herein may be made available advantageously as a non-transitory computer readable medium having program instructions which when executed by a processor will cause the processor to perform the method described herein. The instructions may alternately be made available as a software module on a hardware platform in the form of an independent DCS, programmable logic controller, standalone software that works with control system or other microprocessor based embedded systems. The program instructions when made available as a software module may be installed on an existing programmable system, such as a computer with sufficient computing capabilities. Thus, in yet another aspect, a non-transitory computer readable medium is disclosed having program instructions which when executed by a processor will cause the processor to perform the method described herein.

Further, as already noted herein, in another exemplary aspect, a distributed control system is disclosed based on the methods disclosed herein. The distributed control system can include at least one I/O device which is associated with a control application. The distributed control system can include at least one controller that executes at least one control application, wherein one of the at least one control applications is associated with the I/O device. Each control application can be characterized by a location data (dynamic current location data). The distributed control system also can include at least one communication interface module to transfer I/O device data between the I/O device to the associated control application via at least one relay interface module that includes a dynamic current location data of the controller that includes the associated control application for the I/O device. The manner in which the dynamic current location data is made available may vary, and a few exemplary embodiments are described herein. Other variations and possibilities may occur to those skilled in the art, and are all contemplated to be within the scope of the invention.

Figure 3:
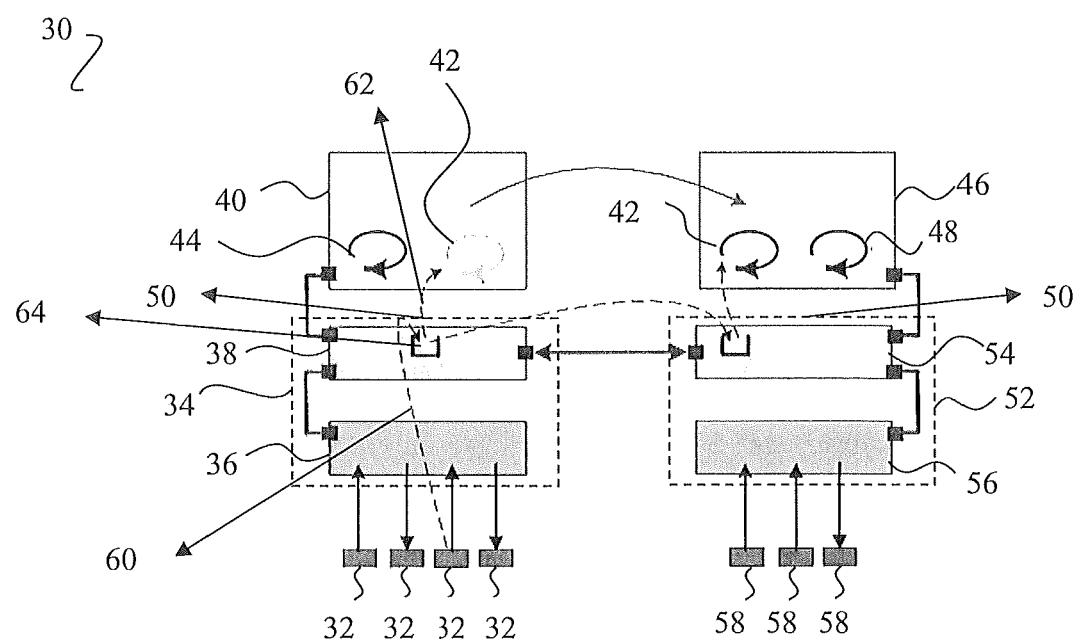
FIG. 3 shows a block diagrammatic representation of an exemplary embodiment of a distributed control system disclosed herein.

In an exemplary embodiment of the DCS disclosed herein, the dynamic current location data of the controller on which each relevant application (control application) or component thereof is being executed may be stored and retrieved based on instructions made available on a relay interface module that is a separate application, which in turn is executed on a CI module. FIG. 3 is a block diagrammatic representation of this embodiment, wherein the distributed control system is represented by numeral 30. The I/O devices 32 are connected to the CI module 34, which is depicted here as including a master 38 and a slave component 36. Controller 40 was the original location on which the applications 42 and 44 were being executed, wherein the application 42 is associated with the I/O devices 32, as depicted by the arrows 60 and 62, through another module on the CI 64. But subsequently application 42 was moved to controller 46 wherein other applications may be running, such as application 48 in FIG. 3. This dynamic current location data is updated on the relay interface module that is the control application 50 being executed on CI module 52 having a master 54 and a slave component 56. This information is used to transfer the I/O device data to controller 46, despite the fact that the controller 46 is linked to the I/O devices 58 through the CI module 52.

In exemplary embodiments, each CI module may be linked to other CI modules through a relay exemplary module, and the dynamic current location data updated on this relay interface module. There can exist a real time communication channel between multiple such relay interface modules in a DCS. The CI master 38 of Controller 40 forwards all those data packets which are not required by any of the applications running in Controller 40 to the relay interface module of the Controller 46. After the successful migration of the application 42, the CI module 34 of the controller 40 can be updated to route all the data packets from a relevant I/O device to the CI module of controller 46 through the respective relay interface modules and the CI module 52 of the controller 46 can be updated to accept all the data packets from the relevant I/O device for application 42.

Figure 4:
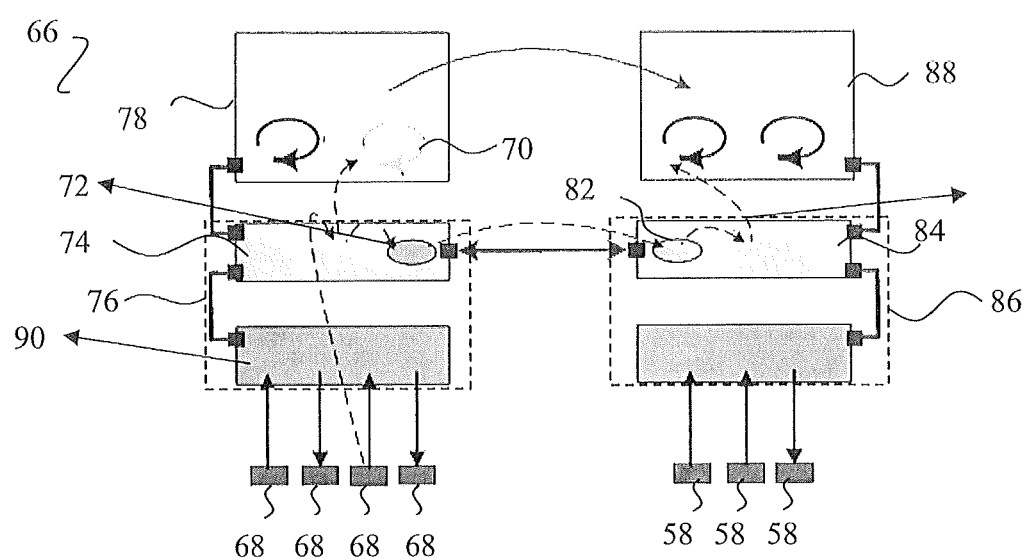
FIG. 4 shows a block diagrammatic representation of another exemplary embodiment of a distributed control system disclosed herein.

In a further alternate exemplary embodiments, components of an application may be executed on the corresponding CI modules such that one component acts as the virtual master while the receiving component behaves as the virtual slave component. FIG. 4 is a block diagrammatic representation of such an embodiment, wherein the distributed control system is represented by numeral 66. In this approach, after the successful migration of application 70 associated with the I/O devices 68 (wherein the association is depicted by the arrow and numeral 80 in FIG. 4), an instance of a virtual CI slave process 72 can be initiated in the master component 74 of the CI module 76 associated with controller 78. Similarly, an instance of a virtual CI master process 82 can be initiated in the master component 84 of the CI module 86 associated with controller 88. These two process instances can initiate a point to point connection similar to the CI master and slave. Thus the data packets from the relevant I/O device traverse the path along I/O Device 68→CI Slave 90→CI Master 74→Virtual Slave 72→Virtual Master 82→CI Master 84→Application 42. Other such variations of the applications and/or the hardware components will become apparent to those skilled in the art, and are contemplated to be within the scope of the invention.

Figure 5:
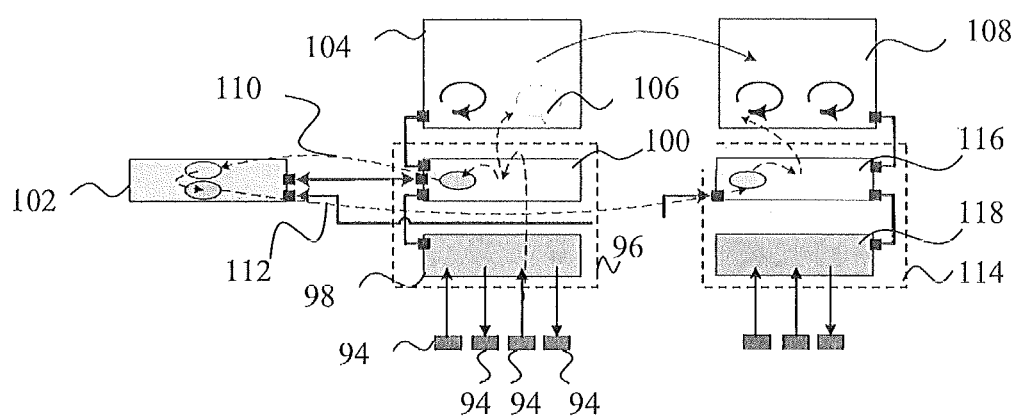
FIG. 5 shows a block diagrammatic representation of yet another exemplary embodiment of a distributed control system disclosed herein.

In another exemplary embodiment, the dynamic current location data of the controller can be provided from a relay interface module that is provided as a centralized local switch. FIG. 5 shows a block diagrammatic representation of such an embodiment, wherein the distributed control system is represented by numeral 92. The I/O devices 94 are connected to the CI module 96 that includes a CI module slave 98 and a CI module master 100. The CI module 96 is in turn connected to the centralized local switch 102 that includes the dynamic current location data. Controller 104 was the original location on which the application 106 was being executed, but subsequently it was moved to controller 108. This dynamic current location data is updated on the centralized local switch 102. The CI module 96 of the controller 104 forwards all those data packets which are not required by any of the applications running in the controller to the centralized local switch 102, as depicted by arrow and numeral 110. The centralized local switch 102 maintains a switching table in any suitable manner known in the art. This table includes (e.g., consists of) information related to the mapping of an I/O device 94 to corresponding application 106 and the controller 108 in which the application 106 is currently being executed. Subsequently, the relevant information and appropriate communication is established between the centralized local switch 102 and the controller 108, as shown by the arrow 112 through the CI module 114 and its respective master 116 and slave components 118. Alternately, those skilled in the art will also appreciate that the relay interface module may be within a local switch, wherein the switch may be used for other purposes, or is specifically made available for the purposes as described herein.

Figure 6:
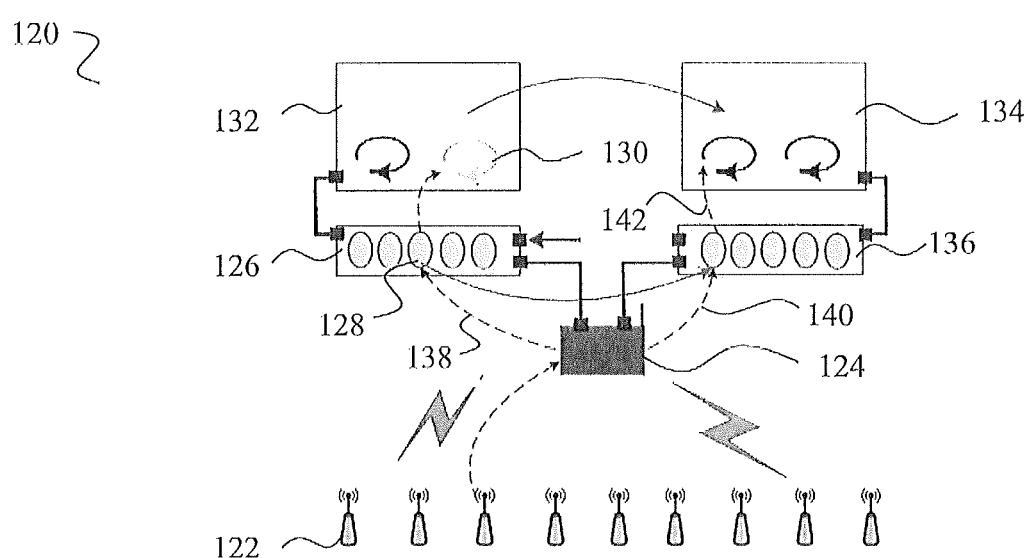
FIG. 6 shows a block diagrammatic representation of a further exemplary embodiment of a distributed control system disclosed herein.

In yet another exemplary embodiment disclosed herein, the dynamic current location data of the application or the component thereof is provided via a wireless gateway. FIG. 6 shows a block diagrammatic representation of such an embodiment, wherein the distributed control system is represented by numeral 120. The I/O devices 122 are connected to the controllers through a wireless gateway, depicted in FIG. 5 by numeral 124. A wireless gateway is a common point of convergence among several wireless I/O units spread in the field. Also a wireless gateway can be connected to multiple CI modules 126 using wired communication medium. Each of the CI modules 126 maintains configuration images, such as 128, as one instance, of the I/O units which send or receive data for the control applications running on the corresponding controller. When the application 130 was initially running on the controller 132, the CI module 126 of the controller 132 maintained a configuration image 128 of the I/O device 124. Due to this, the wireless gateway could communicate the I/O data from the I/O device to the CI module 126 of the controller 132. After the successful migration of the application 130 to controller 134, the configuration image 128 of the I/O device 122 is also migrated from CI module 126 of controller 132 to the CI module 136 of controller 134. Prior to migration of the application 130, the data packets were directed along the path depicted by the arrow 138. After migration, the wireless gateway 124 now redirects the data packets from the I/O device 122 to the CI module 136 of the controller 134 along the path depicted by the arrows 140 and 142.

The exemplary methods and systems described herein allow for the possibility to dynamically connect or disconnect I/O devices in a field network. In an existing scenario, inserting or removing of an I/O device involves shutdown of a controller unit and hence shut down of the corresponding plant process, whereas in the systems described herein, an I/O device can be plugged into the field device network by online updating and porting the preconfigured image of the I/O configuration into the CI module (relay interface module).

In another exemplary embodiment, a DCS, having a plurality of controllers and I/O devices connected to respective controllers through a relay interface module, can have a configuration of a controller along with information about active data or meta data used by the controller stored in the relay interface module to be made available to another controller to which a control application is migrated. This feature can allow easy porting of controller configuration into a new controller that may be another peer controller in the system or a replacement controller being attached to the relay interface module after a controller failure. Thus, a plug and play feature can be provided to controllers and allow soft configuration through the relay interface module and in coordination with a system server program that manages an entire system configuration.

There is a trend towards having real time Ethernet based networks for I/O communication in industrial automation. Moreover, the increased preference towards industrial PCs over embedded controller units for process automation allows for enabling features like runtime migration, distribution of the real time applications across distributed nodes, and the like. The exemplary methods and systems disclosed herein can provide such advantages as enhanced productivity and reduced down time of the process plant by allowing seamless I/O access across controllers in the DCS. The solutions described herein can also allow for online addition or removal (plug and play IO) of new I/O units (and also controller units) without process downtime.

In another exemplary embodiment, a controller can be connected with a relay interface module in a DCS and the relay interface module may be connected to a controller and not be connected to any I/O device. In such an embodiment, the controller can execute a control application that uses I/O data from a remote I/O device made available through a remote relay interface module (a relay interface module other than the relay interface module connected with the controller) connected to the remote I/O devices sending or receiving the I/O data in the DCS.

In yet another exemplary embodiment disclosed herein, I/O devices can be connected with a relay interface module in a DCS and the relay interface module may not be connected to a controller. In such an embodiment, a remote controller (controller not connected as a unit having a relay interface module including CI module and I/O devices) can execute a control application that uses I/O data made available through the relay interface module connected with the I/O devices in the DCS.

While only certain features have been illustrated and described herein, many modifications and changes will occur to those skilled in the art. It is, therefore, to be understood that the appended claims are intended to cover all such modifications and changes as fall within the true spirit of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A distributed control system comprising:
 a plurality of controllers including a first controller having at least one control application, and a second controller;
 at least one input/output (I/O) device for one of sending and receiving I/O data;
 a first communication interface module adapted to function as a relay interface module being communicatively connectable with the at least one I/O device and the first controller of the plurality of controllers, the first communication interface module comprising:
  a network interface for receiving and transmitting I/O data between the at least one I/O device and the first controller, and
  a memory module configured to store location data associated with at least one control application, wherein the location data comprises location information of the first controller on which the control application is being executed; and
 a second communication interface module connected to the second controller of the plurality of controllers;
 wherein the first communication interface module is configured to communicate with the second controller on one of a controller communication network and a dedicated communication network, via the second communication interface module;
 wherein the first controller is an original location on which the control application is executed, wherein the control application is associated with the at least one I/O device through a soft bridge comprised in the first communication interface module, wherein the distributed control system is configured for moving the control application to the second controller, wherein the location data is updated to indicate that the control application is being executed on the second controller, and wherein the first communication interface module is updated to route packets from the at least one I/O device to the second communication interface module based on the updated location data.

2. The distributed control system of claim 1, wherein the first controller among the plurality of controllers is a remote.

3. The distributed control system of claim 1, wherein the at least one I/O device is a remote I/O device.

4. The distributed control system of claim 1, wherein the first communication interface module adapted to function as a relay interface module is configured within a switch.

5. The relay interface module of claim 1, in combination with a dedicated communication network which comprises: a wireless gateway.

6. A method for transferring Input Output (I/O) data between an I/O device and a plurality of controllers in a distributed control system, the method comprising:
 associating a control application with the I/O device in a first communication interface module adapted to function as a relay interface module being communicatively connectable with the I/O device and a first controller of the plurality of controllers;
 transferring the control application from a first controller of the plurality of controllers to a second controller of the plurality of controllers;
 reading location data for the control application from a second communication interface module connected to the second controller of the plurality of controllers; and
 transferring I/O data by routing packets between the I/O device and the second controller among the plurality of controllers based on the location data by the second communication interface module and the first communication interface module, on one of a controller communication network and a dedicated communication network, wherein the location data comprises location information indicating that the control application is being executed on the second controller.

7. The method of claim 6, wherein reading location data comprises:

initiation of a master-slave communication that is enabled between the first and second communication interface modules.

8. The method of claim 7, comprising providing the location data via a wireless gateway.

9. The method of claim 6, comprising providing the location data via a wireless gateway.

* * * * *